United States Patent
Lin et al.

(10) Patent No.: US 8,207,740 B2
(45) Date of Patent: Jun. 26, 2012

(54) METHOD FOR USE WITH A VEHICLE BATTERY PACK HAVING A NUMBER OF INDIVIDUAL BATTERY CELLS

(75) Inventors: Jian Lin, Beverly Hills, MI (US);
Xidong Tang, Sterling Heights, MI (US); Brian J. Koch, Berkley, MI (US); Joseph M. Lograsso, Troy, MI (US); Andrew J. Namou, Southfield, MI (US); Rezina S. Nabi, Troy, MI (US); Damon R. Frisch, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 12/489,684

(22) Filed: Jun. 23, 2009

(65) Prior Publication Data
US 2010/0321025 A1    Dec. 23, 2010

(51) Int. Cl.
*G01N 27/416* (2006.01)
*H02J 7/14* (2006.01)
*H05K 7/14* (2006.01)
*G08B 21/00* (2006.01)
*B60W 10/24* (2006.01)

(52) U.S. Cl. ........ 324/427; 320/104; 320/116; 320/119; 320/132; 320/139; 324/434; 324/430; 307/149; 340/636.1; 340/636.21; 180/65.29; 180/207.3

(58) Field of Classification Search .................. 324/427
See application file for complete search history.

(56) References Cited

U.S. PATENT DOCUMENTS

| | | | |
|---|---|---|---|
| 6,225,780 B1 * | 5/2001 | Koch | 320/118 |
| 6,646,419 B1 * | 11/2003 | Ying | 320/132 |
| 7,525,285 B2 * | 4/2009 | Plett | 320/132 |
| 2003/0076109 A1 * | 4/2003 | Verbrugge et al. | 324/427 |
| 2003/0102871 A1 * | 6/2003 | Yudahira | 324/434 |
| 2005/0017685 A1 * | 1/2005 | Rees et al. | 320/132 |
| 2005/0212481 A1 * | 9/2005 | Nakada | 320/116 |
| 2007/0159137 A1 * | 7/2007 | Verbrugge et al. | 320/132 |
| 2008/0135315 A1 * | 6/2008 | Lin et al. | 180/65.2 |
| 2008/0135316 A1 * | 6/2008 | Koch et al. | 180/65.4 |
| 2009/0091299 A1 | 4/2009 | Lin et al. | |
| 2009/0322283 A1 | 12/2009 | Zhang et al. | |

OTHER PUBLICATIONS

Moore; Stephen W., et al. "A Review of Cell Equalization Methods for Lithium Ion and Lithium Polymer Battery Sytems", SAE Technical Paper Series, Mar. 5-8, 2001, 7 pages, SAE 2001 World Congress, Detroit, Michigan.
Baughman; Andrew, et al. Battery Charge Equalization—State of the Art and Future Trends:, SAE Technical Paper Series, Sep. 7-9, 2005, 8 pages, Illinois Institute of Technology, Chicago, Illinois.

* cited by examiner

*Primary Examiner* — Yalkew Fantu
(74) *Attorney, Agent, or Firm* — Lionel D. Anderson; Reising Ethington P.C.

(57) ABSTRACT

A system and method for use with a vehicle battery pack having a number of individual battery cells, such as a lithium-ion battery commonly used in hybrid electric vehicles. In one embodiment, the method evaluates individual battery cells within a vehicle battery pack in order to obtain accurate estimates regarding their average transient voltage effect, open circuit voltage ($OCV_{Cell}$) and/or state of charge ($SOC_{Cell}$) so that a cell balancing process can be performed. These cell evaluations may be performed fairly soon after the vehicle is turned off and in a manner that utilizes a minimal amount of in-vehicle resources.

20 Claims, 3 Drawing Sheets

METHOD FOR USE WITH A VEHICLE BATTERY PACK HAVING A NUMBER OF INDIVIDUAL BATTERY CELLS

TECHNICAL FIELD

The present invention generally relates to vehicle battery packs and, more particularly, to vehicle battery packs having a number of individual battery cells, such as those found in various types of electric vehicles.

BACKGROUND

Vehicle battery packs can be used to fully or partially power certain vehicles, like plug-in hybrid electric vehicles (PHEV), hybrid electric vehicles (HEV), battery electric vehicles (BEV), etc. The vehicle battery pack may consist of a number of individual cells, where the number can range from tens to hundreds of cells, for example. In vehicle battery packs having a multitude of cells, discrepancies from one cell to another can exist. These discrepancies may involve the state of charge (SOC), voltage, current and/or other characteristics of the cells, and may be caused by a whole host of different factors.

Discrepancies in SOC, for example, can lead to over- and/or undercharging certain battery cells within the vehicle battery pack. Consider the case where a battery pack includes a cell that exhibits a 20% higher SOC value than the average cell within the battery pack. If all of the battery cells are subject to the same charge cycle and all are charged according to the average SOC value, then the outlier cell with the 20% higher charge is likely to be overcharged. In certain battery types like lithium-ion batteries, there can be a preferred charge range (e.g., 30-70% SOC) where overcharging can damage the cells and in turn impact the overall performance of the vehicle battery pack. A similar situation can occur with undercharged cells and a discharge cycle. Replacing a damaged or failed cell can be costly and may not resolve the issue since the characteristics of the new cell may differ from those of the used or aged cells; thus, the over- and/or undercharging problem may still persist. Replacement of the entire vehicle battery pack is likely to be costly and undesirable.

One approach for addressing discrepancies between the battery cells involves a process called 'cell balancing' or 'cell equalization', where the process attempts to balance or equalize the level of charge on the different battery cells within the vehicle battery pack. In order to do this, the cell balancing process needs to accurately evaluate the characteristics of each battery cell; a process that can be made difficult by phenomena such as double layer effect, ohmic resistance, diffusion and hysteresis.

SUMMARY

According to one embodiment, there is provided a method for use with a vehicle battery pack having a plurality of battery cells. The method determines a state of charge for the vehicle battery pack ($SOC_{Pack}$); determines at least one terminal voltage ($V_{Pack}$) and/or ($V_{Cell}$); and uses the state of charge ($SOC_{Pack}$) and the at least one terminal voltage ($V_{Pack}$) and/or ($V_{Cell}$) to determine an average transient voltage effect for the plurality of battery cells.

In another embodiment, there is provided a method for use with a vehicle battery pack having a plurality of battery cells. The method determines a first vehicle battery parameter when the vehicle is 'on'; determines a second vehicle battery parameter when the vehicle is off; uses the first and second vehicle battery parameters to develop a virtual cell model; and uses the virtual cell model to estimate a state of charge ($SOC_{Cell}$) for each of the plurality of battery cells.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE PREFERRED EMBODIMENTS

Figure 1:
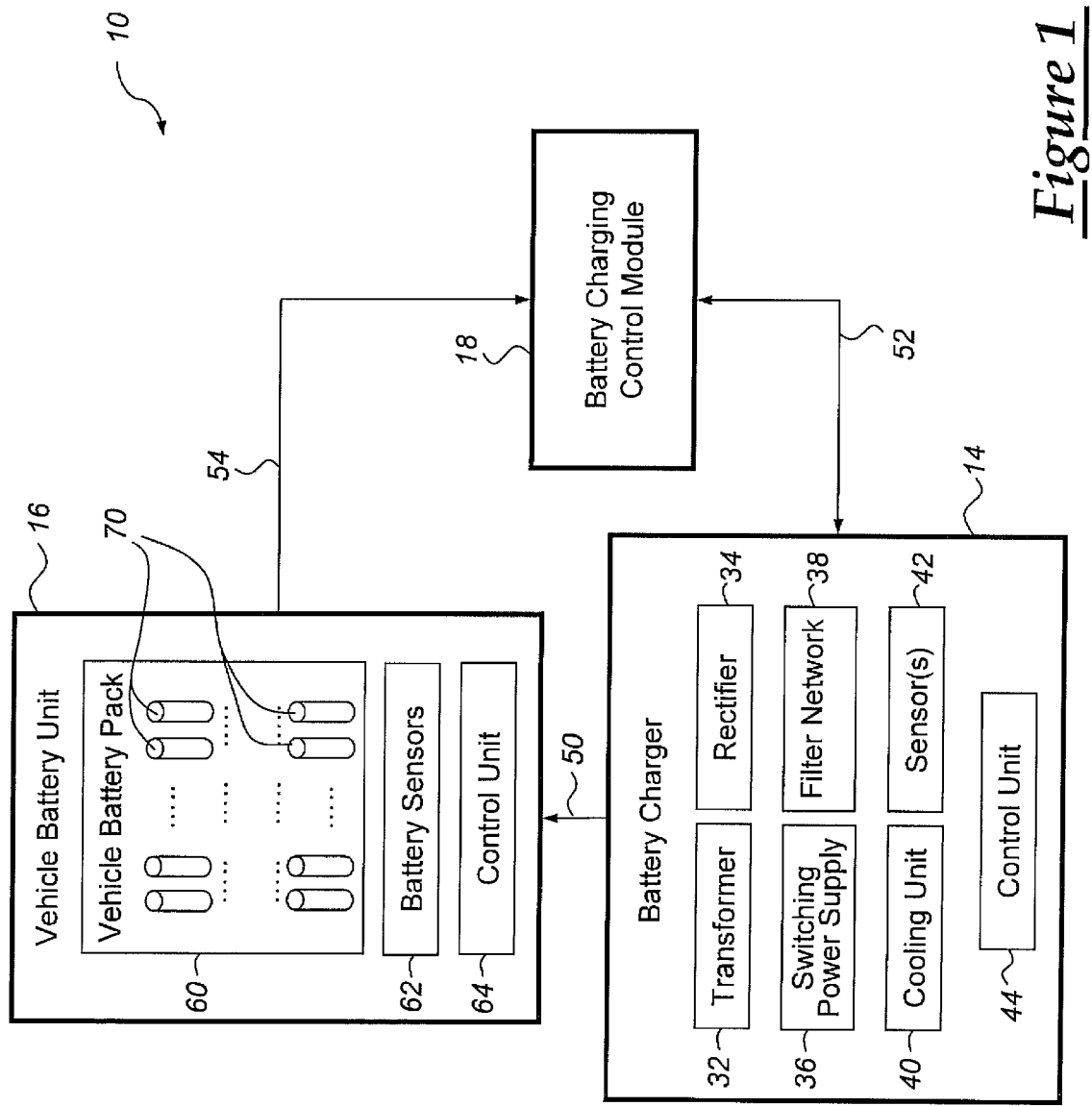
FIG. 1 is a schematic block diagram of an exemplary battery charging system that may be used with a plug-in hybrid electric vehicle (PHEV), for example.

With reference to FIG. 1, there is shown a general schematic view of an exemplary battery charging system 10 for use with a vehicle battery pack having a number of individual battery cells. According to one embodiment, the method described below evaluates individual battery cells within a vehicle battery pack in order to obtain accurate estimates regarding their charge, voltage and/or other characteristics so that a cell balancing process can be performed. These cell evaluations or estimates may be performed fairly soon after the vehicle is turned off and in a manner that utilizes a minimal amount of in-vehicle resources. Although the following description is provided in the context of a plug-in hybrid electric vehicle (PHEV), it should be appreciated that this is merely one possibility and that the exemplary method may be used with any type of vehicle having a battery pack with a number of individual battery cells. This also includes non-plug-in hybrid electric vehicles and battery electrical vehicles (BEV), for example. According to this particular embodiment, battery charging system 10 includes a battery charger 14, a vehicle battery unit 16, and a charging control module 18.

Battery charger 14 is electrically coupled to vehicle battery unit 16 and charges the vehicle battery pack according to charging control signals provided by battery charging control module 18. According to an exemplary embodiment, battery charger 14 is a programmable charger that is mounted in the vehicle and includes a transformer 32, a rectifier 34, a switching power supply 36, a filter network 38, cooling unit 40, one or more sensor(s) 42, a control unit 44, and/or any other suitable components know in the art.

Depending on the particular arrangement, transformer 32 steps-up and/or steps-down the input voltage from an external power source (not shown) to a different and, in some cases, programmable output voltage. Rectifier 34 rectifies the AC signal into a DC signal and includes a half-wave, full-wave or other type of known rectifying arrangement. Switching power supply 36 takes the rectified signal and, according to one embodiment, rapidly switches a power transistor or other switch between saturation ('on') and cutoff ('off') according to a variable duty-cycle whose average corresponds to the desired output voltage. In this way, switching power supply 36 is able to control the amount of current, and hence power, that is provided by battery charger 14 to vehicle battery unit 16. Filter network 38, which is optional, may include any combination of electrical components that can be used to filter, process, and/or condition the output signal before providing it to battery unit 16. Cooling unit 40, also an optional component, may use any combination of fans, water jackets, heat sinks, and/or any other suitable cooling means to reduce the temperature of battery charger 14 during a charge cycle. Although not shown here, battery charger 14 could have multiple power outputs including a high voltage output connected to vehicle battery unit 16 (connection 50) and a lower voltage output (not shown) connected to a 12 v battery or to certain low-voltage vehicle accessories, for example.

Battery charger sensors 42 may include any combination of hardware and/or software components capable of monitoring battery charger conditions such as charger temperature, charger input voltage (typically an AC signal), charger output voltage (typically a DC signal), charger current, etc. Depending on the particular embodiment, these sensors may be integrated within battery charger 14, they may be external sensors located outside of the battery charger, or they may be provided according to some other known arrangement. Battery charger sensors 42 may be coupled directly to control unit 44, or they could be coupled to any number of other devices, components, modules, etc., including some located outside of battery charger 14, like battery charging control module 18.

Control unit 44 may include any variety of electronic processing devices, memory devices, input/output (I/O) devices and/or other known components, and may perform various control and/or communication related functions. For example, control unit 44 could receive sensor signals from the various battery charger sensors 42, package the sensor signals into an appropriate sensor message, and send the sensor message to battery charging control module 18 over a connection 52, such as a CAN bus, a system management bus (SMBus), a proprietary communication link, or any other communication means known to those skilled in the art. In another capacity, control unit 44 may receive charging control signals or other instructions from battery charging control module 18 or some other device, interpret the instructions, and execute the instructions by correspondingly controlling devices within battery charger 14. For instance, if battery charging control module 18 sends a charging control signal to battery charger 14, then control unit 44 may use the charging control signal to manipulate the pulse width modulated (PWM) duty-cycle of switching power supply 36. This, in turn, causes switching power supply 36 to alter the amount of current, and ultimately the amount of power, that is provided by battery charger 14 to vehicle battery unit 16. These are, of course, only some of the potential arrangements and functions of control unit 44, as others are certainly possible.

Vehicle battery unit 16 provides the vehicle with electrical power for propulsion and, depending on the particular embodiment, may be the primary vehicle power source or may be used in conjunction with another power source for power supplementation purposes, to cite two examples. Many different battery types and arrangements may be used, including the exemplary one schematically shown here which includes a vehicle battery pack 60, one or more battery sensors 62, and a control unit 64.

Vehicle battery pack 60 includes a collection of individual battery cells 70 that may be arranged or connected in any number of different configurations in order to exhibit a desired voltage, amperage, capacity, power density, and/or other performance characteristic. These configurations include, for example, connecting the various battery cells 70 in series, parallel or both series and parallel, as is known to those skilled in the art. Generally, it is desirable to provide high power and energy densities, which has led to the development and use of many types of batteries including chemical, non chemical, and others. Some examples of suitable battery types that could be used in vehicle battery pack 60 include all types of lithium-ion (e.g., lithium iron phosphate, lithium nickel manganese cobalt, lithium iron sulfide and lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. According to one embodiment, vehicle battery unit 16 includes a large number of lithium-ion cells (e.g., 25-200 cells), each of which exhibits between 2-5V when charged and is connected in a series and/or parallel configuration with its adjacent cells. Skilled artisans will appreciate that the method described herein is not limited to any one particular type of battery or battery arrangement, as a number of different battery types may be employed.

Different battery types typically exhibit different functional and other characteristics. For instance, different types of batteries may vary according to their overcharging effect, undercharging effect, temperature effect, memory effect or self-discharge rate, internal resistance, etc. Lead-acid and NiMH battery cells, for example, can oftentimes withstand a certain level of over- or undercharging without sustaining permanent damage, while lithium-ion batteries may be more susceptible to such things. Furthermore, there may be cell performance discrepancies within a multi-cell battery pack even though the battery pack is built with similar cells that were manufactured at the same time, etc. One explanation for such discrepancies involves the heat that a particular battery cell is exposed to; heat exposure can affect the performance of a battery cell. For these and other reasons, when charging or discharging vehicle battery pack 60, it is possible for some of the battery cells 70 to charge or discharge at faster rates than others and thereby acquire a disparate amount of charge. This phenomena can be exacerbated by certain battery state estimators (BSE) that only use pack voltage and current to make decisions regarding charging or discharging the battery pack, instead of evaluating the battery pack on a cell-by-cell basis. Hence, the need for cell balancing or equalizing techniques that aim to bring the various battery cells to a more uniform or balanced state. This may improve the life and storage capacity of the battery, increase the vehicle fuel economy, as well as potentially reduce battery warranty issues.

Battery sensors 62 may include any combination of hardware and/or software components capable of monitoring battery conditions such as temperature, voltage, current, state of charge (SOC), state of health (SOH), etc. These sensors may be integrated within vehicle battery unit 16 (e.g., an intelligent or smart battery), they may be external sensors located outside of the vehicle battery unit, or they may be provided according to some other known arrangement. Battery sensors 62 may monitor or otherwise determine temperature, voltage, current, state of charge (SOC), state of health (SOH), etc. for individual cells, for a collection or block of cells within vehicle battery unit 60 (i.e., a subset of the overall collection of cells), for the entire vehicle battery pack, or according to some other method known in the art. Measuring battery parameters on an individual cell basis (e.g., $V_{Cell}$, $T_{Cell}$) may be beneficial if, for example, the middle cells experience different temperatures than the edge or boundary cells of battery pack 60. Battery sensors 62 may employ any type of suitable technique or method for measurement, estimation, evaluation, etc. that is known in the art.

Control unit 64 may include any variety of electronic processing devices, memory devices, input/output (I/O) devices, and other known components, and may perform various control and/or communication related functions. For example, control unit 64 could receive sensor signals from the various battery sensors 62, package the sensor signals into an appropriate sensor message, and send the sensor message to battery charging control module 18 over a connection 54, such as a CAN bus, a system management bus (SMBus), a proprietary communication link, or any other communication means known to those skilled in the art. It is possible for control unit 64 to gather battery sensor readings and store them in local memory so that a comprehensive sensor message can be provided to battery charger control module 18 at a later time, or the sensor readings can be forwarded to module 18 or some other destination as soon as they arrive at control unit 64, to cite a few possibilities. In another capacity, control unit 64 can store pertinent battery parameters and background information pertaining to the battery's cell chemistry, cell capacity, upper and lower battery voltage limits, battery current limits, battery temperature limits, temperature profiles, battery impedance, number or history of charge/discharge events, SOC vs OCV look up tables, etc.

Battery charging control module 18 monitors one or more conditions pertaining to battery charger 14 and/or battery unit 16, and uses the sensed conditions to control a charging and/or discharging process in an optimum manner. Depending on the particular embodiment, battery charging control module 18 may be a stand-alone vehicle electronic module, it may be incorporated or included within another vehicle electronic module (such as a power train control module or a hybrid control module), or it may be part of a larger network or system (such as a battery management system (BMS), a vehicle energy management system, etc.), to name a few possibilities. Battery charging control module 18 may also be part of or interact with a system that determines a desired hybrid operating mode (e.g., accelerating, braking, idling, stopping, etc.) and may implement electrical power management actions accordingly. Battery charging control module 18 may perform a number of different functions. These could include, for example, receiving sensor readings and other information from battery charger 14 and/or vehicle battery unit 16, performing the various steps of the exemplary method described below, and providing control signals to the battery charger and/or the vehicle battery unit in order to carry out cell balancing functions, as described below.

Battery charging control module 18 may include any variety of electronic processing devices, memory devices, input/output (I/O) devices, and other known components, and may perform various control and/or communication related functions. The battery charging control module can be electronically connected to other vehicle devices and modules via a suitable vehicle communications network, and can interact with them when required. In an exemplary embodiment, battery charging control module 18 includes an electronic processing device that executes instructions for software, firmware, programs, algorithms, scripts, etc. that are stored in memory devices of module 18 and govern the battery charging process and methods described herein. Battery charging control module 18 could also store or maintain look-up tables (e.g., state of charge (SOC) versus open circuit voltage (OCV) look-up tables, etc.), various sensor readings from battery charge 14 and/or vehicle battery unit 16, and predetermined values used by one or more algorithms (e.g., upper and lower charging thresholds, etc.), for example. In the case of look-up tables that correlate state of charge (SOC) with open circuit voltage (OCV), different look-up tables could be provided for different temperatures or temperature ranges. These are, of course, only some of the possible functions and capabilities of battery charging control module 18, as other embodiments could also be used.

During an exemplary cell balancing operation, battery charging control module 18 balances the various battery cells 70 within vehicle battery pack 60 so that they all exhibit a relatively uniform state of charge (SOC). This may be performed before the actual charging process begins, during the charging process, or at some other time. In one embodiment, battery charging control module 18 receives sensor readings from battery charger 14 and/or vehicle battery unit 16, uses that information to estimate the SOC of each cell and identify overcharged battery cells, and then sends a cell balancing control signal to battery charger 14 and/or vehicle battery unit 16. The cell balancing control signal may increase the SOC of undercharged cells and/or reduce the SOC of overcharged cells. It should be appreciated that the term 'overcharged' may refer to a battery cell that has an SOC of more than 100% (regardless of the average cell charge in the battery) or it may refer to a cell that has a greater charge than the average cell charge in the battery (regardless of its absolute or actual SOC value), to cite a few possibilities. According to an exemplary embodiment, the cell balancing control signal reduces the charge on overcharged cells by simply using a resistor to bleed off excess energy in the form of heat; the resistor may be part of a switch-type circuit coupled to each cell for self-discharge purposes. Other techniques may also be used, including diverting energy from the overcharged cells to other lesser-charged cells. This may occur within battery charger 14, vehicle battery unit 16, battery charging control module 18 or some other device for a time period that is established by the cell balancing control signal. Other methods and techniques for balancing or equalizing battery charge may also be used.

During an exemplary charging process, an external power source (not shown) provides a high voltage AC signal (e.g., 110 volts, 220 volts, etc.) to battery charger 14. Rectifier 34, which may include a full-wave rectifier or bridge, rectifies the high voltage AC signal into a high voltage rectified signal. The high voltage rectified signal is then provided to transformer 32, which steps-up the input voltage to provide a constant high voltage DC signal. The high voltage DC signal is filtered and connected to battery unit 16 via switching power supply 36, which may use pulse-width modulation (PWM) or some other technique to vary the power provided to the battery unit. For example, assume that a 110 volt AC input is rectified and stepped-up to a relatively constant 500 volt DC output. Battery charging control module 18 can control the output power supplied from battery charger 14 to battery unit 16 by providing a charging control signal to manipulate the amount of current provided at this elevated and constant voltage. One way to manipulate or control the current is to adjust the duty cycle of a PWM signal sent to switching power supply 36, although other techniques could certainly be used. It should be appreciated that battery charging system 10 is not limited to the foregoing example where the voltage is maintained relatively constant and the current is adjusted; it is also possible to control the voltage or some other aspect of the output power provided by battery charger 14.

Skilled artisans will appreciate that voltages measured by battery sensors 62 may include certain transient voltage effects, which are a result of the transient nature of the electrochemistry of the battery. As used herein, the term 'transient voltage effect' broadly and collectively refers to all types of transient voltages in vehicle battery pack 60; these could include, for example, voltages associated with battery diffusion, hysteresis, double layer effect, ohmic resistance in the battery, etc. Some transient voltages are associated with delays in the chemical reaction which are unable to keep up with corresponding electrical stimulus or demand. In most lithium-ion batteries, battery diffusion is a non-negligible factor and is a long-time dynamic process that continues to occur after the vehicle has been shut off. Some cell balancing systems address battery diffusion by simply ignoring its effects or by waiting several hours before taking terminal voltage measurements, at which time most of the diffusion voltage has subsided. Waiting several hours before cell balancing—and hence charging—is not always a practical solution, however. Hysteresis voltage, which can take even longer to subside than diffusion voltage—sometimes may days— exists in a number of battery types, including lithium-ion batteries. Like diffusion voltage, hysteresis voltage can be a non-negligible factor when taking terminal voltage measurements. Double layer voltage for certain lithium-ion batteries, on the other hand, has been observed to subside in a relatively short amount of time (e.g., 30 seconds) after the vehicle is turned off. Therefore, the exemplary method described below waits for a relatively short turn-off period (e.g., 10 seconds-15 minutes) before taking various measurements and readings that will be used in the cell evaluating and balancing processes. This way, voltages associated with double layer effect and ohmic resistance are assumed to be negligible and are ignored, while the remainder of the transient voltages (e.g., diffusion and hysteresis voltages) are assumed to be non-negligible and to be the same for each battery cell 70.

Figure 2:
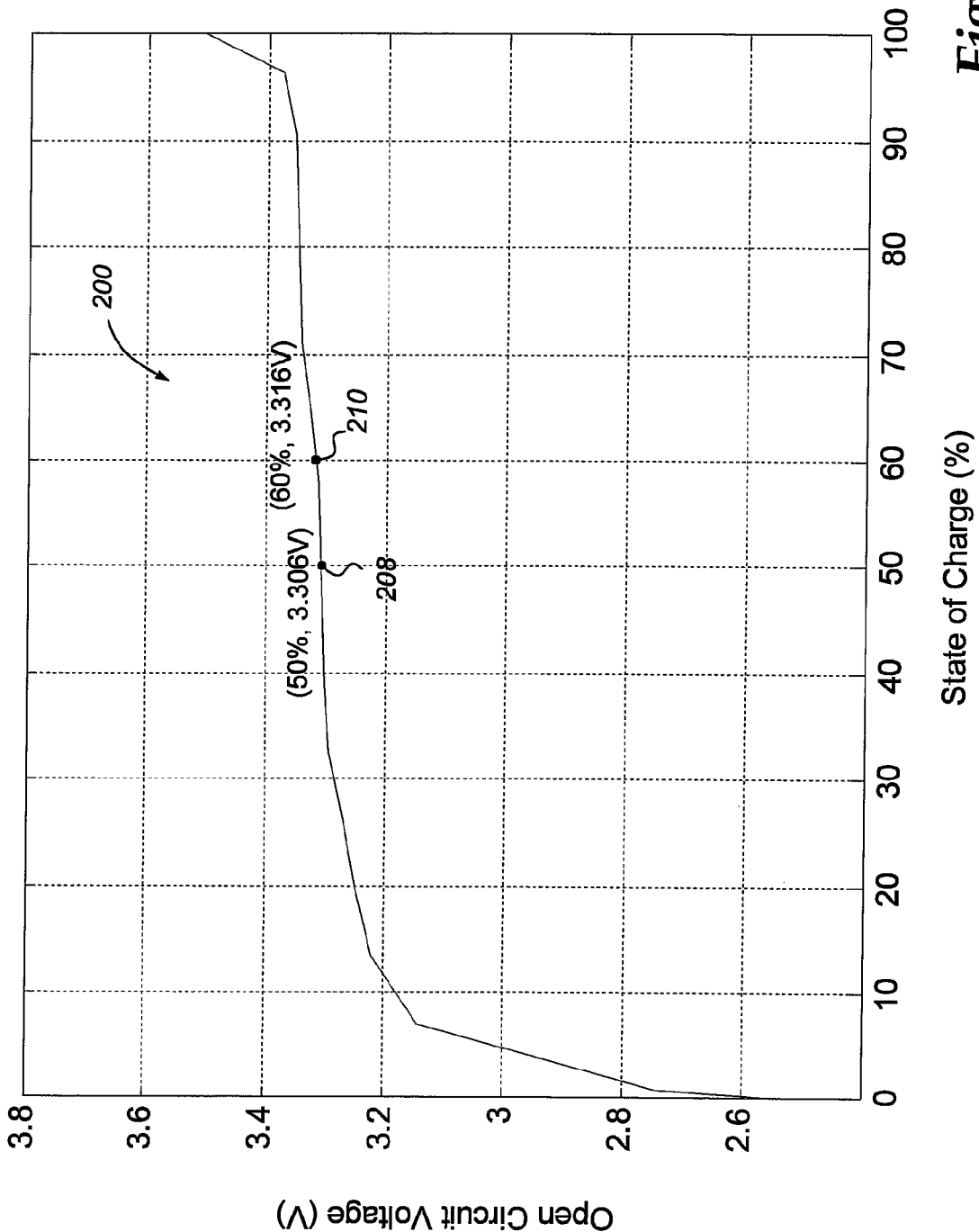
FIG. 2 is a plot for an exemplary lithium-ion battery cell that shows a relationship between state of charge (SOC) and open circuit voltage (OCV)

Turning now to FIG. 2, there is shown a plot 200 for an exemplary lithium-ion battery cell that shows a relationship between state of charge (SOC) and open circuit voltage (OCV). Skilled artisans will appreciate that in plot 200, the OCV (y-axis) does not change much with a change in the SOC (x-axis); i.e., plot 200 has a relatively flat mapping curve. Thus, small changes in the OCV may result in significant changes in SOC. The mapping curves for other types of batteries, like NiCd batteries, may be significantly steeper or different than plot 200. Consider points 208 and 210 which correspond to (50% SOC, 3.306V OCV) and (60% SOC, 3.316V OCV), respectively. According to plot 200, a change of just 10-20 mV in OCV results in a 10% swing in SOC; larger changes in the OCV result in even greater SOC variations. Therefore, methods that do not effectively take transient voltage effects into account, including relatively small effects due to diffusion and hysteresis voltages, may result in inaccurate OCV readings and significant errors in the corresponding SOC estimate. If these inaccurate SOC estimates are used during the cell balancing process, then certain battery cells may be over- and/or undercharged, as previously explained. The exemplary method described below uses certain techniques to estimate or otherwise determine an average transient voltage effect for the plurality of battery cells 70, which in turn enables it to more accurately determine SOC on a cell-by-cell basis. Moreover, the exemplary method is able to do so without using significant computing and/or memory resources so that it can be performed on a large number of battery cells by resources that reside exclusively on the vehicle.

Figure 3:
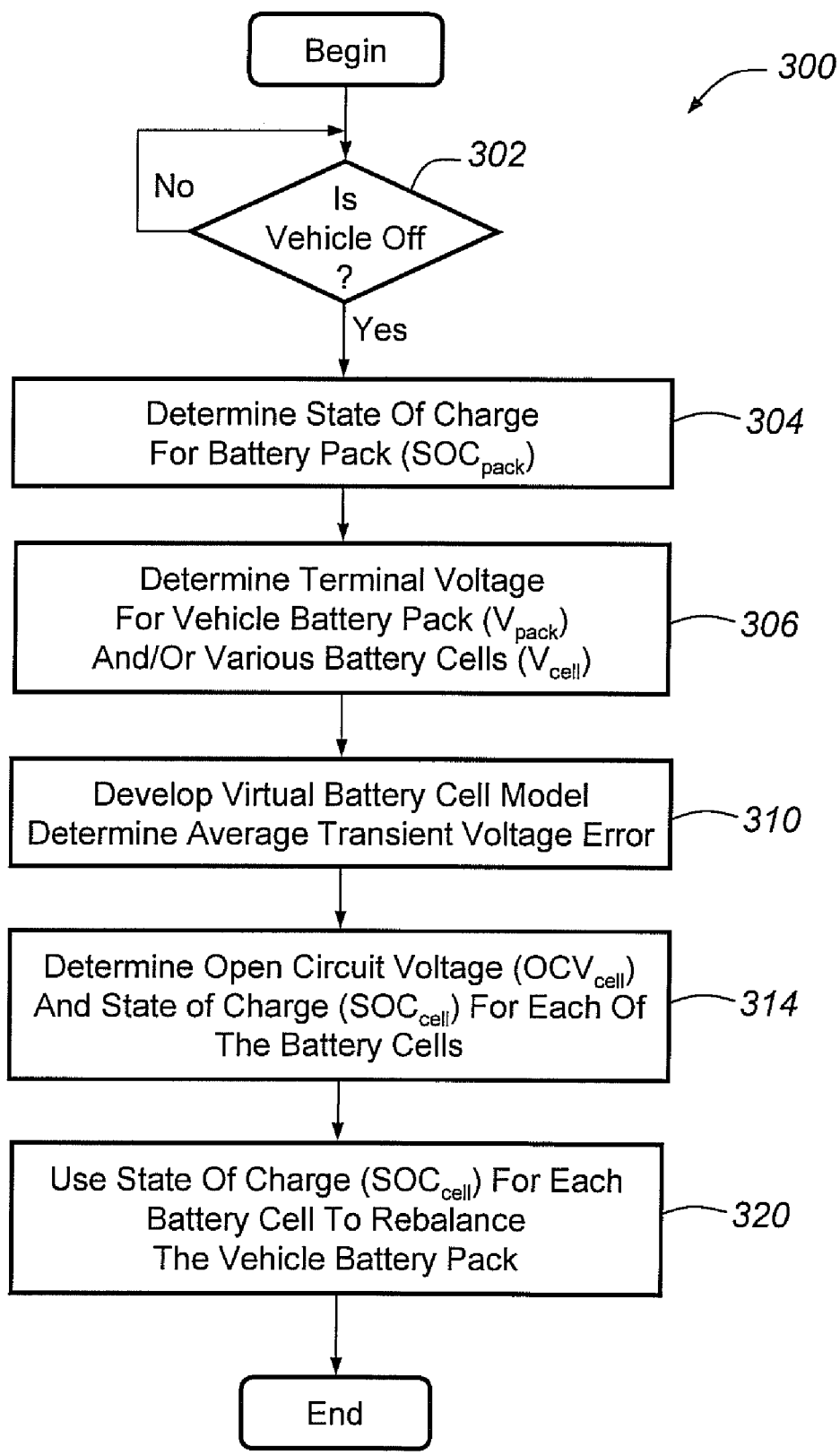
FIG. 3 is a flowchart of an exemplary method that may be used with the exemplary system in FIG. 1 and/or the exemplary lithium-ion battery cell in FIG. 2.

Turning to FIG. 3, there is shown an exemplary method 300 for use with a vehicle battery pack having a number of individual battery cells. Method 300 may be used with any vehicle that includes a battery having a plurality of individual battery cells. As previously explained, individual battery cells can exhibit different charging, discharging and/or other characteristics and this can cause one battery cell to acquire more charge than another battery cell. This charge disparity may lead to a charge imbalance across the vehicle battery pack, and can ultimately result in overcharged/undercharged battery cells, potentially damaged battery cells or the battery pack not completely operating within the full SOC range. Thus, exemplary method 300 balances the charge on the various battery cells so that a relatively uniform charge is maintained across the vehicle battery pack. Although the following exemplary descriptions are provided in the context of a PHEV having a lithium-ion battery, it should be appreciated that the present method is not limited to that specific embodiment and can be used with other applications and other battery types as well.

Beginning with step 302, the method determines if the vehicle is 'off'. Being 'off', in the context of this step, can mean many different things but preferably involves the battery being electrically isolated from the vehicle system (e.g., through the use of electrical contactors). For example, step 302 may determine if a 'key-off' event has occurred where the operator has turned or otherwise engaged a key or other ignition device so that vehicle engine and/or motor are turned off. In such an embodiment, battery charging control module 18 may receive a signal from an ignition module or some other component, device, module, etc. indicating that a key-off situation has occurred. In another embodiment, step 302 may evaluate the status of battery unit 16 to determine if the battery unit is providing power to the vehicle. These are, of course, only some of the potential ways in which step 302 may determine if the vehicle is 'off', as any other technique known in the art may be used as well. If the vehicle is not 'off', then the method circles back to step 302 for continued monitoring; if the vehicle is 'off', then the method may continue on to step 304.

According to a particular embodiment, method 300 performs one or more of the following steps once the vehicle has been 'off' for a relatively short turn-off period (e.g., 30 seconds-15 minutes). A unique feature of the turn-off period is that, in certain battery types like lithium-ion batteries, it is long enough so that double-layer and ohmic voltages within the vehicle battery pack become negligible (this can make the virtual battery cell model simpler), but is short enough so that the method does not have to wait for diffusion and hysteresis voltages to become negligible (as mentioned, diffusion and hysteresis voltages can oftentimes take many hours to sufficiently dissipate). Thus, by waiting for the expiration of the turn-off period before taking terminal voltage measurements, method 300 is able to develop a relatively simple virtual battery cell model, as subsequently explained, and can do so relatively soon after the vehicle is turned off. Turn-off periods that are longer or shorter than the exemplary one provided above may also be used.

Next, step 304 determines a state of charge for vehicle battery pack 60 ($SOC_{Pack}$). In one embodiment, step 304 gathers or retrieves the last SOC value that was saved in in-vehicle memory before the vehicle was turned off. Accurately determining an open circuit voltage (OCV) for battery pack 60 can be difficult when the vehicle is being operated (OCV generally corresponds to a voltage under equilibrium conditions that is measured at a certain temperature with no load attached to the cell or battery). However, it is possible to rather accurately estimate an SOC value for battery pack 60 ($SOC_{Pack}$) while the vehicle is 'on'. Techniques for estimating SOC include ones based on look-up tables, computational methods, modeling and/or any other method known in the art. Data for executing these techniques may be provided by sources such as the battery pack manufacturer, the vehicle manufacturer, etc. Thus, an accurate SOC value for battery pack 60—e.g., one that generally accounts for and has removed errors due to transient effects such as diffusion voltage ($V_{diff}$) and hysteresis voltage ($V_{hyst}$)—can be determined and saved in in-vehicle memory while the vehicle is being operated. This may be done on a periodic basis so that the state of charge value ($SOC_{Pack}$) is continuously updated. Although an elaborate description of how to derive a state of charge value ($SOC_{Pack}$) is omitted here, it should be appreciated that any number of known techniques may be used by step 304. Other previously-saved vehicle battery parameter(s), in addition to or in lieu of the state of charge ($SOC_{Pack}$), may also be retrieved or otherwise determined by step 304.

Step 306 determines a terminal voltage for at least one of the vehicle battery pack ($V_{Pack}$) and/or the plurality of battery cells ($V_{cell}$). Put differently, step 306 may determine a terminal voltage for the overall battery pack 60 ($V_{Pack}$), or a terminal voltage for each of the plurality of individual cells ($V_{Cell}$), or both. In an exemplary embodiment, battery sensors 62 measure or otherwise sense these parameters and convey this information to control unit 64 and/or battery charging control module 18. For example, step 306 may wait for expiration of the turn-off period before taking terminal voltage measurements in order to ensure that no electrical current is entering or exiting battery unit 16 (as mentioned above, electrical current flow can result in double layer ($V_{dl}$) and ohmic voltages that affect the accuracy of the terminal voltage reading). Once the turn-off period expires, step 306 may measure the terminal voltage for each individual cell ($V_{cell}$) and that of the overall battery pack ($V_{Pack}$)—since electrical current is neither flowing into nor out of the battery unit, it can be assumed that the double layer and ohmic voltages are zero. It should be recognized that the voltage readings gathered in this step may still include contributions due to diffusion voltage ($V_{diff}$) and hysterisis voltage ($V_{hyst}$), as these voltages can take hours or even days following vehicle turn-off to fully dissipate. Unlike the $SOC_{Pack}$ value gathered in step 304, which was determined at an earlier time when the vehicle was still 'on', the terminal voltages gathered in this step are preferably determined after the vehicle is 'off' and after the turn-off period has expired. Other vehicle battery parameter(s), in addition to or in lieu of ($V_{cell}$) and ($V_{Pack}$), may also be determined in step 306; this includes individual cell temperatures ($T_{cell}$), for example.

The measurements, readings, parameters, etc. that are gathered in any of the steps of exemplary method 300, including step 306, may be representative of a single value, a number of values averaged or filtered over time, and/or values obtained according to some other technique known in the art. For instance, the readings obtained in step 306 may be gathered over a sampling period (e.g., 10 sec-200 sec) and then averaged, filtered, etc. to reduce measurement noise and to smooth the data. Some exemplary techniques that may be used include low-pass filters, simple moving averages (SMA), cumulative moving averages (CMA), weighted moving averages (WMA) and/or exponential moving averages (EMA), to cite a few. Once these measurements, readings, parameters, etc. are obtained, they may be provided to battery charging control module 18 in response to a request from the module or they can be provided on a periodic basis without being requested, for example.

Next, the vehicle battery parameters gathered in the previous steps are used to develop a virtual battery cell model, step 310. The virtual battery cell model may be thought of as a reference cell that is representative of the average battery cell within vehicle battery pack 60. The virtual cell model does not physically exist in vehicle battery pack 60; however, it may be useful for calculation purposes and to make estimates regarding other cells within the vehicle battery pack. Generally speaking, the terminal voltage of the virtual battery cell model ($V_{CellVirtual}$) is equal to its hypothetical open circuit voltage ($OCV_{CellVirtual}$) plus transient voltage effects such as those associated with a double layer effect ($V_{dl}$), ohmic effects ($V_{Ohmic}$), diffusion ($V_{diff}$) and hysterisis ($V_{hyst}$):

$$V_{CellVirtual} = OCV_{CellVirtual} + V_{dl} + V_{Ohmic} + V_{diff} + V_{hyst} \quad \text{(Equation 1)}$$

Step 310 preferably determines the average transient voltage effect for the virtual battery cell model or, put differently, the average transient voltage effect for the plurality of battery cells in the vehicle battery pack. This average transient voltage effect, which provides information regarding the estimated diffusion and hysteresis voltages ($V_{diff}$), ($V_{hyst}$), can later be used to accurately estimate the open circuit voltage ($OCV_{Cell}$) and the state of charge ($SOC_{Cell}$) for each of the battery cells. With this information, exemplary method 300 can rebalance the battery cells within vehicle battery pack 60 and avoid overcharging and damaging individual cells. There are a number of ways in which step 310 may be performed including, but certainly not limited to, the following exemplary embodiments.

According to one embodiment, step 310 first uses the state of charge ($SOC_{Pack}$) value gathered in step 304 to determine an open circuit voltage for the vehicle battery pack ($OCV_{Pack}$). Skilled artisans will appreciated that look-up tables, computational methods, modeling and/or other methods may be used correlate SOC to OCV. Because the state of charge ($SOC_{Pack}$) was determined in such a way that largely compensated for diffusion and hysteresis voltage effects, the resulting open circuit voltage ($OCV_{Pack}$) should also be largely void of such effects. Second, step 310 divides the open circuit voltage ($OCV_{Pack}$) by the number of battery cells within vehicle battery pack 60 to determine an average open circuit voltage ($OCV_{CellVirtual}$) for the plurality of battery cells. Because this value is representative of the average cell within the vehicle battery pack, it is part of the virtual battery cell model and will subsequently be used as a reference. Third, step 310 divides the terminal voltage ($V_{Pack}$) that was determined in step 306 by the number of battery cells within vehicle battery pack 60 to determine an average terminal voltage ($V_{CellVirtual}$) for the plurality of battery cells. Because this value is representative of the average cell within vehicle battery pack 60, it may be part of the virtual battery cell model. Lastly, step 310 subtracts the open circuit voltage ($OCV_{CellVirtual}$) from the terminal voltage ($V_{CellVirtual}$) to determine the average transient voltage effect for the plurality of battery cells; see Equation (1). In this case, the terminal voltage ($V_{Pack}$) was determined after the vehicle was turned off and after the expiration of the turn-off time; hence, it is assumed that the double layer ($V_{dl}$) and ohmic ($V_{Ohmic}$) voltages are negligible and that the average transient voltage effect is largely due to diffusion voltage ($V_{diff}$) and hysteresis voltage ($V_{hyst}$). In the preceding embodiment, the state of charge ($SOC_{Pack}$) and the terminal voltage ($V_{Pack}$) are used to determine the average transient voltage effect.

According to another embodiment, step 310 first uses the state of charge ($SOC_{Pack}$) value gathered in step 304 to determine an open circuit voltage for the vehicle battery pack ($OCV_{Pack}$). This step is largely the same as that described above in the previous embodiment. Second, step 310 subtracts the open circuit voltage ($OCV_{Pack}$) from the terminal voltage ($V_{Pack}$) previously determined in step 306 to determine an overall transient voltage effect for the entire vehicle battery pack 60. The overall transient voltage effect is generally representative of all of the transient voltages present when the terminal voltage ($V_{Pack}$) was measured (see Equation 1)—which in this case is primarily the diffusion and hysteresis voltages ($V_{diff}$), ($V_{hyst}$), as the double layer and ohmic voltages are assumed to be negligible, as already explained. Third, the overall transient voltage effect is divided by the number of battery cells within vehicle battery pack 60 to determine the average transient voltage effect for the plurality of battery cells. In the preceding embodiment, the state of charge ($SOC_{Pack}$) and the terminal voltage ($V_{Pack}$) are again used to determine the average transient voltage effect.

According to yet another embodiment, step 310 first uses the state of charge ($SOC_{Pack}$) value gathered in step 304 to determine an open circuit voltage for the vehicle battery pack ($OCV_{Pack}$). This step is largely the same as that described above in the previous embodiments. Second, the open circuit voltage ($OCV_{Pack}$) is divided by the number of battery cells within vehicle battery pack 60 to determine the average open circuit voltage for the plurality of battery cells ($OCV_{CellVirtual}$). This value may be part of the virtual battery cell model. Third, the various terminal voltages ($V_{Cell}$) gathered in step 306 are averaged to determine a mean or average terminal voltage ($V_{CellVirtual}$) for the entire vehicle battery pack 60. This value may also be part of the virtual battery cell model. Fourth, the average open circuit voltage ($OCV_{CellVirtual}$) is subtracted from the average terminal voltage ($V_{CellVirtual}$) to determine an average transient voltage effect for the plurality of battery cells. In the preceding embodiment, the state of charge ($SOC_{Pack}$) and the terminal voltages ($V_{Cell}$) are used to determine the average transient voltage effect; this differs somewhat from the previous embodiments where ($SOC_{Pack}$) and ($V_{Pack}$) are used.

Skilled artisans will appreciate that any number of different embodiment and methods may be used to determine an average transient voltage effect for the plurality of battery cells within vehicle battery pack 60, and that the previous embodiments are only illustrative of some of the possibilities. In each of the preceding embodiments, step 310 compares a known open circuit voltage ($OCV_{Pack}$) and/or ($OCV_{Cell}$) that generally do not have significant transient voltage effects to a measured terminal voltage ($V_{Pack}$) and/or ($V_{Cell}$) that generally do have transient voltage effects. By knowing the difference between these values, step 310 is able to glean information regarding the average transient voltage effect present in each of the individual cells. Each of the above-provided embodiments assumes that the diffusion and hysteresis voltages ($V_{diff}$), ($V_{hyst}$) are generally the same across all of the battery cells within vehicle battery pack 60. This assumption is at least premised on the fact that the battery cells are exposed to the same driving cycle.

Now that an average transient voltage effect is known for the collection of battery cells, step 314 uses the virtual cell model to estimate the open circuit voltage ($OCV_{Cell}$) and/or the state of charge ($SOC_{Cell}$) for each of the individual battery cells. As explained in step 306, a terminal voltage for each of the individual battery cells has already been acquired so that the method is already in possession of x-number of $V_{cell}$ readings, 'x' is the number of battery cells within vehicle battery pack 60 (e.g., $V_{cell1}$, $V_{cell2}$, $V_{cell3}$ ... $V_{cellx}$). Similar to equation (1) the terminal voltage of each individual cell ($V_{Cell}$) is equal to its open circuit voltage ($OCV_{Cell}$) plus transient voltage effects associated with the double layer effect ($V_{dl}$), ohmic effects ($V_{Ohmic}$), diffusion ($V_{diff}$), and hysterisis ($V_{hyst}$), for example:

$$V_{Cell1} = OCV_{Cell1} + V_{dl} + V_{Ohmic} + V_{diff} + V_{hyst}$$

$$V_{Cell2} = OCV_{Cell2} + V_{dl} + V_{Ohmic} + V_{diff} + V_{hyst}$$

$$V_{Cell3} = OCV_{Cell3} + V_{dl} + V_{Ohmic} + V_{diff} + V_{hyst}$$

...

$$V_{Cellx} = OCV_{Cellx} + V_{dl} + V_{Ohmic} + V_{diff} + V_{hyst} \quad \text{(Equation 2)}$$

Step 314 may ignore the double layer ($V_{dl}$) and ohmic ($V_{Ohmic}$) voltages, as the measured $V_{cell}$ readings were preferably taken after a sufficiently long turn-off period. Since the terminal voltage ($V_{Cell}$) and average transient voltage effect for each of the battery cells is now known, step 314 uses Equation 2 to estimate an open circuit voltage ($OCV_{Cell}$) for each cell. With the open circuit voltage ($OCV_{Cell}$), step 314 is able to utilize look-up tables, computational methods, modeling and/or other methods to correlate OCV to SOC and estimate a state of charge ($SOC_{Cell}$), as already explained. It is possible for steps 310 and 314 to be performed using only in-vehicle resources.

Step 320 then uses the state of charge ($SOC_{Cell}$) for each of the plurality of battery cells to rebalance vehicle battery pack 60 and to help prevent individual battery cells from being overcharged. This may be accomplished in one of a variety of different ways. According to one embodiment, step 320 uses the state of charge ($SOC_{Cell}$) for each of the plurality of battery cells to identify overcharged battery cells (i.e., battery cells that have a higher charge than one or more other cells), estimates discharge parameters needed to reduce the charge on these overcharged battery cells, and then discharges the overcharged battery cells according to the discharge parameters. The discharge parameters may include an estimated discharge time, an estimated discharge rate and/or any other discharge parameter known to affect the discharge, charge removal, etc. of a battery cell. A variety of techniques including, passive balancing, active balancing, charge shunting, etc., may be used with step 320. The results of step 320 may be incorporated into charging control signals, cell balancing control signals, as well as other signals and messages sent from battery charging control module 18 to battery charger 14 and/or vehicle battery unit 16.

According to a passive balancing embodiment, step 320 identifies the battery cells with the highest charge in the vehicle battery pack (e.g., this may be based on their state of charge ($SOC_{Cell}$)), and removes excess energy from those cells through a bypass resistor or other discharge load. This process may continue until the charge level of the higher charged battery cells reduces to a charge level of some of the weaker charged battery cells. In an active balancing embodiment, step 320 identifies the battery cells with the highest charge and delivers their excess charge to one or more battery cells with a lower charge. Step 320 could continue until the expiration of a discharge time or until a desired voltage or state of charge is reached, to cite a few possibilities. People skilled in the art should appreciate that these are only some of the techniques that can be implemented to balance the battery cells, as others may be used as well.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a method having different steps, including those having less, more or a different combination of steps, may be used in lieu of exemplary method 300. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a vehicle battery pack having a plurality of battery cells, comprising the steps of:
    (a) determining a state of charge for the vehicle battery pack ($SOC_{Pack}$), wherein the state of charge ($SOC_{Pack}$) corresponds to when the vehicle is 'on' and generally does not include effects due to diffusion voltage, hysteresis voltage or both;
    (b) determining a terminal voltage for at least one of the vehicle battery pack ($V_{Pack}$) or the plurality of battery cells ($V_{Cell}$), wherein the terminal voltage ($V_{Pack}$) or ($V_{Cell}$) corresponds to when the vehicle is 'off' and generally does include effects due to diffusion voltage, hysteresis voltage or both; and
    (c) using the state of charge ($SOC_{Pack}$) and the at least one terminal voltage ($V_{Pack}$) or ($V_{Cell}$) to determine an average transient voltage effect for the plurality of battery cells.

2. The method of claim 1, wherein step (a) further comprises: i) estimating the state of charge ($SOC_{Pack}$) while the vehicle is 'on', ii) saving the state of charge estimate ($SOC_{Pack}$) in in-vehicle memory, and iii) retrieving the previously-saved state of charge estimate ($SOC_{Pack}$) from the in-vehicle memory after the vehicle is 'off'.

3. The method of claim 1, wherein step (b) further comprises measuring the at least one terminal voltage ($V_{Pack}$) or ($V_{Cell}$) after the vehicle is 'off' and a turn-off period of 30 seconds-15 minutes has expired.

4. The method of claim 1, wherein step (c) further comprises: i) using the state of charge ($SOC_{Pack}$) to determine an open circuit voltage for the vehicle battery pack ($OCV_{Pack}$), ii) dividing the open circuit voltage ($OCV_{Pack}$) by the number of battery cells within the vehicle battery pack to determine an average open circuit voltage for the plurality of battery cells ($OCV_{CellVirtual}$), iii) dividing the terminal voltage ($V_{Pack}$) by the number of battery cells within the vehicle battery pack to determine an average terminal voltage for the plurality of battery cells ($V_{CellVirtual}$), and iv) subtracting the open circuit voltage ($OCV_{CellVirtual}$) from the terminal voltage ($V_{CellVirtual}$) to determine the average transient voltage effect for the plurality of battery cells.

5. The method of claim 1, wherein step (c) further comprises: i) using the state of charge ($SOC_{Pack}$) to determine an open circuit voltage for the vehicle battery pack ($OCV_{Pack}$), ii) subtracting the open circuit voltage ($OCV_{Pack}$) from the terminal voltage ($V_{Pack}$) to determine an overall transient voltage effect for the entire vehicle battery pack, and iii) dividing the overall transient voltage effect for the entire vehicle battery pack by the number of battery cells to determine the average transient voltage effect for the plurality of battery cells.

6. The method of claim 1, wherein step (c) further comprises: i) using the state of charge ($SOC_{Pack}$) to determine an open circuit voltage for the vehicle battery pack ($OCV_{Pack}$), ii) dividing the open circuit voltage ($OCV_{Pack}$) by the number of battery cells within the vehicle battery pack to determine an average open circuit voltage for the plurality of battery cells ($OCV_{CellVirtual}$), iii) averaging the terminal voltages ($V_{Cell}$) for the plurality of battery cells to determine an average terminal voltage ($V_{CellVirtual}$), and iv) subtracting the average open circuit voltage ($OCV_{CellVirtual}$) from the average terminal voltage ($V_{CellVirtual}$) to determine the average transient voltage effect for the plurality of battery cells.

7. The method of claim 1, further comprising the steps of:
    (d) subtracting the average transient voltage effect from the terminal voltage ($V_{Cell}$) of each of the plurality of battery cells to estimate an open circuit voltage for each of the plurality of battery cells ($OCV_{Cell}$);
    (e) using the open circuit voltage ($OCV_{Cell}$) to determine a state of charge for each of the plurality of battery cells ($SOC_{Cell}$); and
    (f) using the state of charge ($SOC_{Cell}$) for each of the plurality of battery cells to rebalance the vehicle battery pack and prevent battery cells from being overcharged.

8. The method of claim 7, wherein step (e) further comprises using an open circuit voltage versus state of charge look-up table to determine the state of charge ($SOC_{Cell}$) from the open circuit voltage ($OCV_{Cell}$).

9. The method of claim 7, wherein step (f) further comprises: i) using the state of charge ($SOC_{Cell}$) for each of the plurality of battery cells to identify overcharged battery cells, ii) estimating discharge parameters needed to reduce the charge on the overcharged battery cells, and iii) discharging the overcharged battery cells according to the discharge parameters.

10. The method of claim 1, wherein the battery pack is a lithium-ion battery pack and the vehicle is a plug-in hybrid electric vehicle (PHEV).

11. A method for use with a vehicle battery pack having a plurality of battery cells, comprising the steps of:
    (a) determining a first vehicle battery parameter when the vehicle is 'on';
    (b) determining a second vehicle battery parameter when the vehicle is off,
    wherein the second vehicle battery parameter is determined after the expiration of a turn-off period;
    (c) using the first and second vehicle battery parameters to develop a virtual cell model that is a reference for the plurality of battery cells; and
    (d) using the virtual cell model to estimate a state of charge ($SOC_{Cell}$) for each of the plurality of battery cells, wherein in-vehicle resources are used to develop the virtual cell model in step (c) and estimate the ($SOC_{Cell}$) in step (d).

12. The method of claim 11, wherein step (a) further comprises determining a state of charge for the vehicle battery pack ($SOC_{Pack}$) while the vehicle is 'on', and saving the state of charge ($SOC_{Pack}$) with in-vehicle memory, and step (c) further comprises retrieving the previously-saved state of charge ($SOC_{Pack}$) from the in-vehicle memory after the vehicle is 'off', and using the previously-saved state of charge ($SOC_{Pack}$) and the second vehicle parameter to develop the virtual cell model.

13. The method of claim 11, wherein step (b) further comprises determining a terminal voltage for at least one of the vehicle battery pack ($V_{Pack}$) or the plurality of battery cells ($V_{Cell}$) after the vehicle is turned 'off', and step (c) further comprises using the first vehicle battery parameter and the at least one terminal voltage ($V_{Pack}$) or ($V_{Cell}$) to develop the virtual cell model.

14. The method of claim 13, wherein step (b) determines the terminal voltage ($V_{Pack}$) or ($V_{Cell}$) after the vehicle is turned 'off' and a turn-off period of 10 seconds-15 minutes has expired so that double-layer and ohmic voltages become negligible but diffusion and hysteresis voltages are non-negligible.

15. The method of claim 11, wherein step (c) further comprises using the first and second vehicle battery parameters to develop a virtual cell model that assumes that each of the plurality of battery cells generally has the same diffusion and hysteresis voltages.

16. The method of claim 11, wherein step (d) further comprises using the virtual cell model to estimate an average transient voltage effect for the plurality of battery cells, wherein the average transient voltage effect is largely due to diffusion and hysteresis voltages.

17. The method of claim 11, step (d) further comprises: i) subtracting an average transient voltage effect from a terminal voltage ($V_{Cell}$) of each of the plurality of battery cells to estimate an open circuit voltage for each of the plurality of battery cells ($OCV_{Cell}$); ii) using the open circuit voltage ($OCV_{Cell}$) to determine the state of charge ($SOC_{Cell}$); and iii) using the state of charge ($SOC_{Cell}$) to rebalance the vehicle battery pack and prevent battery cells from being overcharged.

18. The method of claim 17, wherein step (d) (ii) further comprises using an open circuit voltage versus state of charge look-up table to determine the state of charge ($SOC_{Cell}$) from the open circuit voltage ($OCV_{Cell}$).

19. The method of claim 17, wherein step (d) (iii) further comprises: i) using the state of charge ($SOC_{Cell}$) for each of the plurality of battery cells to identify overcharged battery cells, ii) estimating discharge parameters needed to reduce the charge on the overcharged battery cells, and iii) discharging the overcharged battery cells according to the discharge parameters.

20. The method of claim 11, wherein the battery pack is a lithium-ion battery pack and the vehicle is a plug-in hybrid electric vehicle (PHEV).

* * * * *